US012501989B2

(12) United States Patent
Lin et al.

(10) Patent No.: US 12,501,989 B2
(45) Date of Patent: Dec. 23, 2025

(54) SYSTEM AND METHOD FOR REAL-TIME VIRTUAL APPLICATION OF MAKEUP EFFECTS DURING LIVE VIDEO STREAMING

(71) Applicant: Perfect Mobile Corp., New Taipei (TW)

(72) Inventors: Yi-Wei Lin, Taipei (TW); I-Ting Shen, New Taipei (TW)

(73) Assignee: PERFECT MOBILE CORP., New Taipei (TW)

( * ) Notice: Subject to any disclaimer, the term of this patent is extended or adjusted under 35 U.S.C. 154(b) by 1013 days.

(21) Appl. No.: 17/545,023

(22) Filed: Dec. 8, 2021

(65) Prior Publication Data

US 2022/0175114 A1 Jun. 9, 2022

Related U.S. Application Data

(60) Provisional application No. 63/122,673, filed on Dec. 8, 2020.

(51) Int. Cl.
*G06V 20/20* (2022.01)
*A45D 44/00* (2006.01)
(Continued)

(52) U.S. Cl.
CPC .......... *A45D 44/005* (2013.01); *G06T 19/006* (2013.01); *G06V 20/20* (2022.01); *G06V 40/161* (2022.01); *G06V 40/171* (2022.01)

(58) Field of Classification Search
CPC .... A45D 44/005; G06T 19/006; G06V 20/20; G06V 40/161; G06V 40/171; G06V 10/62
See application file for complete search history.

(56) References Cited

U.S. PATENT DOCUMENTS 9,460,462 B1 10/2016 Walker et al.
9,661,239 B2 5/2017 Guissin
(Continued)

FOREIGN PATENT DOCUMENTS

CN 108227922 A 6/2018
CN 108271058 A 7/2018
(Continued)

OTHER PUBLICATIONS

Hamilton, D.; "Modiface Live Applies Virtual Makeup to Real-Time Video And Video Chats;" Modiface Live Applies Virtual Makeup to Real-Time Video and Video Chats; Dec. 2015; pp. 1-4.
(Continued)

*Primary Examiner* — Jitesh Patel
(74) *Attorney, Agent, or Firm* — McClure, Qualey & Rodack, LLP

(57) ABSTRACT

An applicator device receives a request from a client device to initiate a communication session and causes a camera of the client device to capture a video of a user of the client device. The applicator device obtains the video of the user. The applicator device tracks a facial region of the user depicted in the video and displays the tracked facial region in a first window. The applicator device determines a target facial feature in the tracked facial region and displays a target sub-region surrounding the target facial feature within the tracked facial region in a second window. The applicator device performs virtual application of a selected cosmetic effect and displays the virtual application of the selected cosmetic effect in the first window and the second window on the applicator device.

15 Claims, 7 Drawing Sheets

(51) Int. Cl.
*G06T 19/00* (2011.01)
*G06V 40/16* (2022.01)

(56) References Cited

U.S. PATENT DOCUMENTS

| | | | |
|---|---|---|---|
| 10,242,589 | B2 | 3/2019 | Yamanashi et al. |
| 10,431,010 | B2 | 10/2019 | Yang et al. |
| 2007/0014485 | A1 | 1/2007 | McAlpine et al. |
| 2007/0242066 | A1 | 10/2007 | Levy |
| 2016/0357578 | A1* | 12/2016 | Kim ............. A45D 44/005 |
| 2017/0256084 | A1 | 9/2017 | Iglehart et al. |
| 2018/0075524 | A1 | 3/2018 | Sartori et al. |
| 2018/0374128 | A1 | 12/2018 | Mao et al. |
| 2019/0171869 | A1* | 6/2019 | Fortune ............. G06T 7/00 |
| 2019/0246065 | A1 | 8/2019 | Lee et al. |
| 2019/0251754 | A1* | 8/2019 | Yang ............. G06T 7/73 |
| 2020/0015575 | A1 | 1/2020 | Fu et al. |

FOREIGN PATENT DOCUMENTS

| | | |
|---|---|---|
| CN | 110149301 A | 8/2019 |
| JP | 2002-092132 A | 3/2002 |
| JP | 2011-228936 A | 11/2011 |
| KR | 2003-0059685 A | 7/2003 |
| KR | 101823869 B1 | 1/2018 |
| TW | 608446 B | 12/2017 |

OTHER PUBLICATIONS

"Makeup Beauty Plus Photo Editor for Android;" https://download.cnet.com/Makeup-Beauty-Plus-Photo-Editor/3000-31713_4-77721984.html; Dec. 2017; pp. 1-7.
"NARS One-On-One;" https://www.narscosmetics.com/USA/virtual-makeup-appointment.html; pp. 1-6.
"Makeup Try-On Goes Completely Digital With Launch of Perfect365 PRO;" https://www.businesswire.com/news/home/20170627005818/en/Makeup-Try-On-Completely-Digital-Launch-Perfect365-PRO; Jun. 2017; pp. 1-5.
Tan, C.; "No Testing of Make-Up & Skincare When Sephora Re-Opens This Friday, but you can Still 'Try' the Products on Your Face;" https://www.todayonline.com/8days/liveandlearn/vanityandhealth/no-testing-make-skincare-when-sephora-re-opens-friday-you-can; Jun. 2020; pp. 1-5.
"M.A.C Launches Virtual Appointments;" https://www.maccosmetics.com.au/culture-mac-launches-virtual-appointments; Apr. 2020; pp. 1-20.
Otake, S.; "Shiseido App Adds Makeup to Faces on Video Conferences;" Japan Times; Oct. 2016; pp. 1-2.

* cited by examiner

SYSTEM AND METHOD FOR REAL-TIME VIRTUAL APPLICATION OF MAKEUP EFFECTS DURING LIVE VIDEO STREAMING

CROSS-REFERENCE TO RELATED APPLICATION

This application claims priority to, and the benefit of, U.S. Provisional Patent Application entitled, "Method to let BA do the virtual makeup on user's face in real time," having Ser. No. 63/122,673, filed on Dec. 8, 2020, which is incorporated by reference in its entirety.

TECHNICAL FIELD

The present disclosure relates to a service for performing real-time virtual application of makeup effects during live video streaming.

BACKGROUND

Consumers invest a substantial amount of money in makeup tools and accessories. However, it can be challenging for consumers to achieve the same results as a makeup professional even with the aid of conventional self-help guides.

SUMMARY

In accordance with one embodiment, an applicator device receives a request from a client device to initiate a communication session and causes a camera of the client device to capture a video of a user of the client device. The applicator device obtains the video of the user. The applicator device tracks a facial region of the user depicted in the video and displays the tracked facial region in a first window. The applicator device determines a target facial feature in the tracked facial region and displays a target sub-region surrounding the target facial feature within the tracked facial region in a second window. The applicator device performs virtual application of a selected cosmetic effect and displays the virtual application of the selected cosmetic effect in the first window and the second window on the applicator device.

Another embodiment is a system that comprises a memory storing instructions and a processor coupled to the memory. The processor is configured by the instructions to receive a request from a client device to initiate a communication session and cause a camera of the client device to capture a video of a user of the client device. The processor is further configured to obtain the video of the user. The processor is further configured to track a facial region of the user depicted in the video and display the tracked facial region in a first window. The processor is further configured to determine a target facial feature in the tracked facial region and display a target sub-region surrounding the target facial feature within the tracked facial region in a second window. The processor is further configured to perform virtual application of a selected cosmetic effect and display the virtual application of the selected cosmetic effect in the first window and the second window.

Another embodiment is a non-transitory computer-readable storage medium storing instructions to be implemented by an applicator device. The applicator device comprises a processor, wherein the instructions, when executed by the processor, cause the applicator device to receive a request from a client device to initiate a communication session and cause a camera of the client device to capture a video of a user of the client device. The processor is further configured to obtain the video of the user. The processor is further configured to track a facial region of the user depicted in the video and display the tracked facial region in a first window. The processor is further configured to determine a target facial feature in the tracked facial region and display a target sub-region surrounding the target facial feature within the tracked facial region in a second window. The processor is further configured to perform virtual application of a selected cosmetic effect and display the virtual application of the selected cosmetic effect in the first window and the second window.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Consumers invest a substantial amount of money in makeup tools and accessories to achieve a desired look. However, it can be challenging for consumers to achieve the same results as a makeup professional even with the aid of conventional self-help guides. Embodiments are disclosed for performing real-time virtual application of cosmetic effects during live video streaming, whereby a beauty advisor applies cosmetic effects to the facial region of a user during a live video chat session. A description of a networked environment that includes an applicator device 102 and a client device 122 for performing real-time virtual application of cosmetic effects during live video streaming is disclosed followed by a discussion of the operation of the components.

Figure 1:
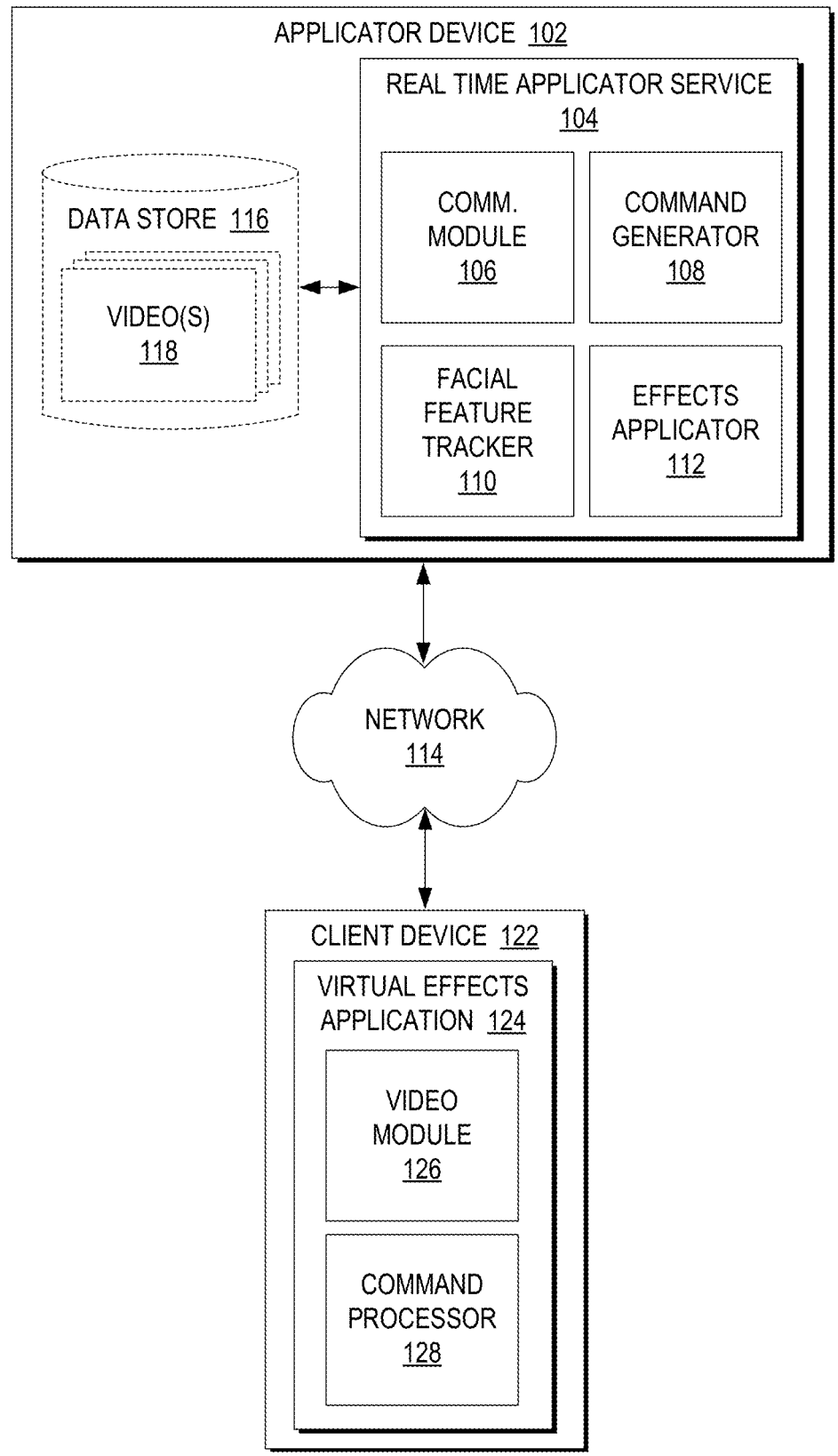
FIG. 1 is a block diagram of a networked environment that includes an applicator device and a client device for performing real-time virtual application of cosmetic effects during live video streaming according to various embodiments of the present disclosure.

FIG. 1 is a block diagram of a networked environment that includes an applicator device 102 and a client device 122 in which the techniques for performing real-time virtual application of cosmetic effects during live video streaming may be implemented. The applicator device 102 may be embodied as, but not limited to, a smartphone, a tablet computing device, a laptop computer, a cloud-based computing device, or any other system providing computing capability. Alternatively, the applicator device 102 may employ one or a plurality of computing devices that can be arranged, for example, in one or more server banks, computer banks or other arrangements. Such computing devices can be located in a single installation or can be distributed among different geographical locations.

The networked environment also includes a client device 122 where the client device 122 may similarly be embodied as, but not limited to, a smartphone, a tablet computing device, a laptop computer, and so on. Both the applicator device 102 and the client device 122 may be equipped with digital content recording capabilities such as a front facing camera. The applicator device 102 and the client device 122 are communicatively coupled to each other via a network 114 such as, for example, the Internet, intranets, extranets, wide area networks (WANs), local area networks (LANs), wired networks, wireless networks, or other suitable networks, etc., or any combination of two or more such networks.

A real time applicator service 104 executes on a processor of the applicator device 102 and includes a communication module 106, a command generator 108, a facial feature tracker 110, and an effects applicator 112. A virtual effects application 124 executes on a processor of the client device 122 and includes a video module 126 and a command processor 128. The communication module 106 is configured to receive a request from a client device 122 to initiate a communication session (e.g., video chat session).

In response to receiving a request from the client device 122 to initiate a communication session, the communication module 106 establishes a communication session with the client device 122 and notifies the command generator 108. The command generator 108 then issues a command to the command processor 128 in the client device 122, where the command processor 128 is configured to direct the video module 126 to cause a camera of the client device 122 to capture a video of a user of the client device 122.

The video module 126 streams the captured video of the user back to the applicator device 102 over the network 114. This allows a beauty advisor utilizing the applicator device 102 to view a live video stream of the user and to perform real-time virtual application of cosmetic effects on the facial region of the user of the client device 122. While the beauty advisor performs a sequence of actions, the command generator 108 is in constant communication with the command processor 128 of the client device 122, where the commands issued by the command generator 108 cause the client device 122 to execute various actions in connection with the application of cosmetic effects.

As the applicator device 102 receives the live video stream from the video module 126 of the client device 122, the applicator device 102 temporarily stores the video 118 in a data store 116 in the applicator device 102. As one of ordinary skill will appreciate, the video 118 received from the video module 126 may be encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The facial feature tracker 110 analyzes the video 118 in the data store 116 and tracks the facial region of the user depicted in the video 118. The tracked facial region is displayed in a first window in a user interface displayed to the beauty advisor utilizing the applicator device 102. A cosmetic effects toolbar is also displayed in the first window, thereby allowing the beauty advisor to select one or more cosmetic effects to demonstrate to the user of the client device 122. For some embodiments, the command also causes the client device 122 to display a cosmetic effects toolbar in the first window, where the cosmetic effects toolbar allows the user to select which cosmetic effects that the user wishes to have the beauty advisor apply. For example, the user of the client device 122 may wish to have the beauty advisor demonstrate how to apply a blush cosmetic. In this regard, both the beauty advisor and the user can select one or more cosmetic effects on their respective devices.

Once the beauty advisor or the user of the client device 122 selects a cosmetic effect from the cosmetic effects toolbar, the selection is processed by the command generator 108 executing in the applicator device 102. For some embodiments, the facial feature tracker 110 in the applicator device 102 automatically determines a target facial feature based on the selected cosmetic effect and displays a target sub-region surrounding the target facial feature within the tracked facial region in a second window of the user interface shown on the applicator device 102. As an alternative, the beauty advisor or the user of the client device 122 can directly identify a target facial feature. For some embodiments, the command generator 108 issues a command to the command processor 128, which causes the client device 122 to similarly display a target sub-region surrounding the target facial feature within the tracked facial region in a second window of the user interface shown on the client device 122.

The beauty advisor utilizes the applicator device 102 to apply the selected cosmetic effect onto the facial region of the user, where virtual application of the select cosmetic effect is displayed in the user interface shown on the applicator device 102. The effects applicator 112 captures each action performed by the beauty advisor and communicates with the command generator 108, which issues commands to the command processor 128. The commands cause the client device 122 to display virtual application of the cosmetic effect performed by the beauty advisor. The command generator 108 is in constant communication with the command processor 128. This achieves a technical effect of allowing the user to experience virtual application of selected cosmetic effects virtually in real time.

Figure 2:
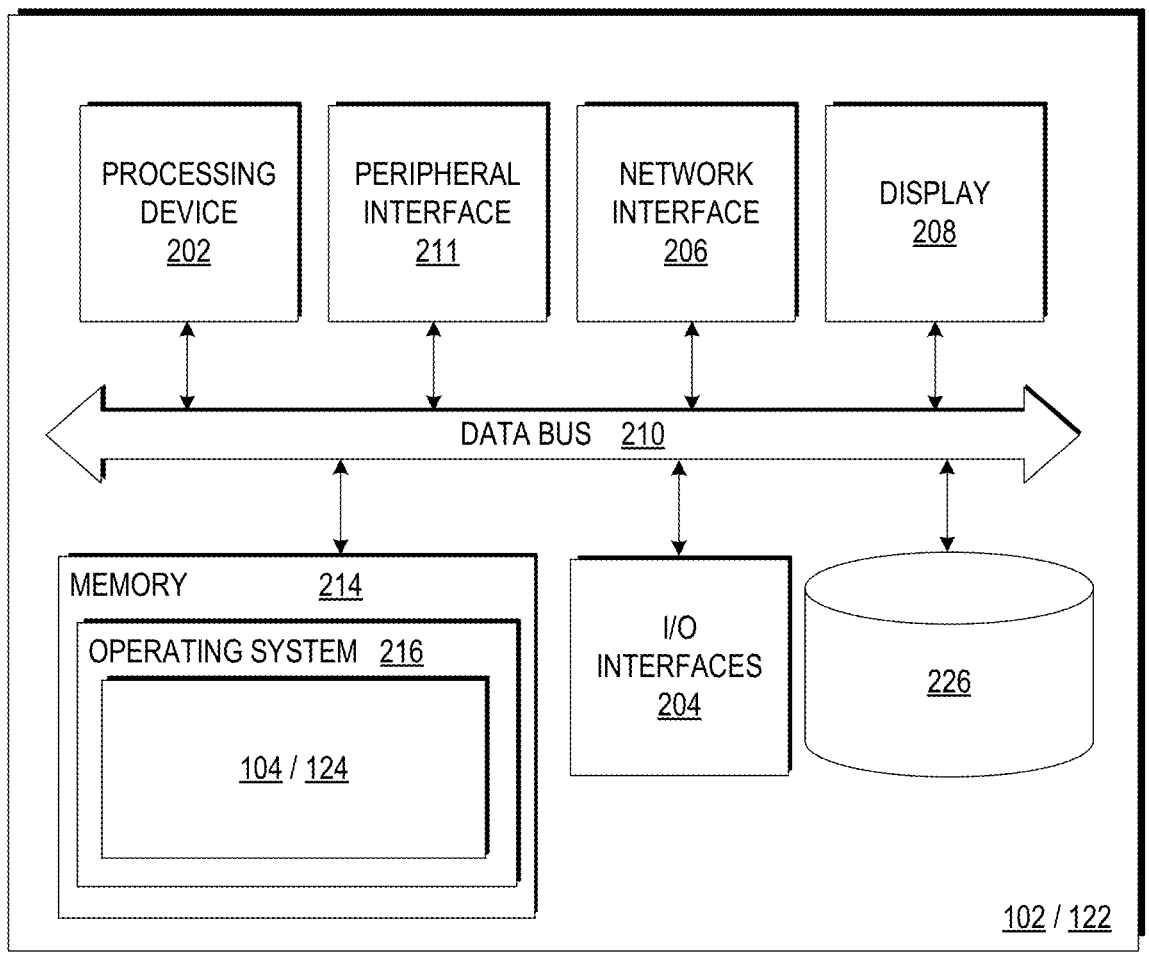
FIG. 2 is a schematic diagram of the applicator device and the client device of FIG. 1 according to various embodiments of the present disclosure.

FIG. 2 illustrates a schematic block diagram of components found in both the applicator device 102 and the client device 122 in FIG. 1. Each device 102, 122 may be embodied as a desktop computer, portable computer, dedicated server computer, multiprocessor computing device, smart phone, tablet, and so forth. As shown in FIG. 2, each device 102, 122 comprises memory 214, a processing device 202, a number of input/output interfaces 204, a network interface 206, a display 208, a peripheral interface 211, and mass storage 226, wherein each of these components are connected across a local data bus 210.

The processing device 202 may include a custom made processor, a central processing unit (CPU), or an auxiliary processor among several processors associated with the applicator device 102, a semiconductor based microprocessor (in the form of a microchip), a macroprocessor, one or more application specific integrated circuits (ASICs), a plurality of suitably configured digital logic gates, and so forth.

The memory 214 may include one or a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the applicator device 102 and the client device 122 displayed in FIG. 1.

In accordance with such embodiments, the components are stored in memory 214 and executed by the processing device 202, thereby causing the processing device 202 to perform the operations/functions disclosed herein. For some embodiments, the components in the applicator device 102 may be implemented by hardware and/or software.

Input/output interfaces 204 provide interfaces for the input and output of data. For example, where the applicator device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
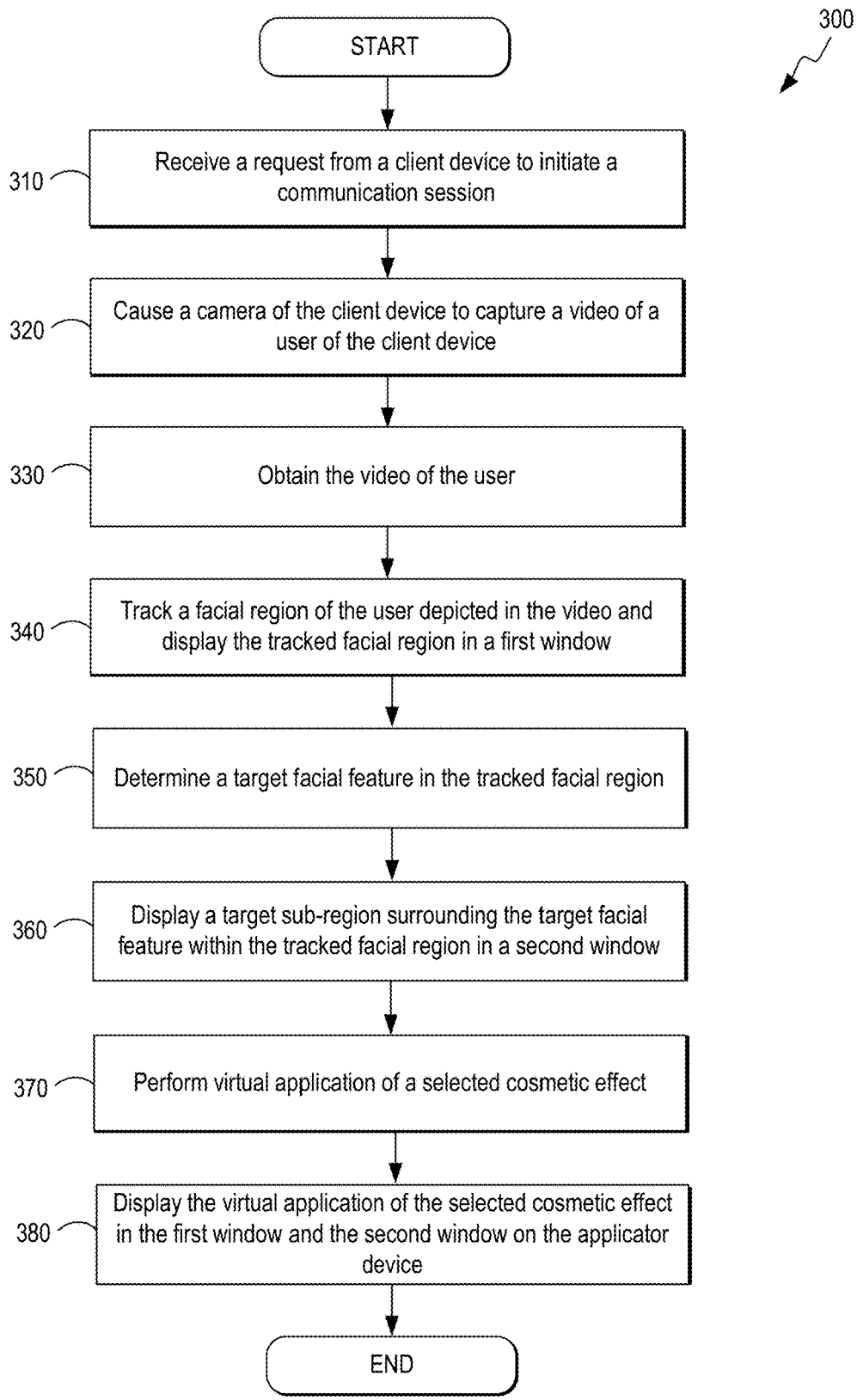
FIG. 3 is a top-level flowchart illustrating examples of functionality implemented as portions of the applicator device of FIG. 1 for performing real-time virtual application of cosmetic effects during live video streaming according to various embodiments of the present disclosure.

Reference is made to FIG. 3, which is a flowchart 300 in accordance with various embodiments for performing real-time virtual application of cosmetic effects during live video streaming, where the operations are performed by the applicator device 102 in FIG. 1. It is understood that the flowchart 300 of FIG. 3 provides merely an example of the different types of functional arrangements that may be employed to implement the operation of the various components of the applicator device 102. As an alternative, the flowchart 300 of FIG. 3 may be viewed as depicting an example of steps of a method implemented in the applicator device 102 according to one or more embodiments.

Although the flowchart 300 of FIG. 3 shows a specific order of execution, it is understood that the order of execution may differ from that which is displayed. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the applicator device 102 (FIG. 1) receives a request from a client device 122 (FIG. 1) to initiate a communication session. At block 320, the applicator device 102 causes a camera of the client device 122 to capture a video of a user of the client device 122. At block 330, the applicator device 102 obtains the video of the user. At block 340, the applicator device 102 tracks a facial region of the user depicted in the video and displays the tracked facial region in a first window. For some embodiments, a visible boundary is displayed around the tracked facial region in the first window.

At block 350, the applicator device 102 determines a target facial feature in the tracked facial region. For some embodiments, the target facial feature in the tracked facial region is determined by displaying the tracked facial region in the first window and obtaining a selection of a facial feature from either the beauty advisor utilizing the applicator device 102 or the user of the client device 122. The target facial feature is determined based on the selected facial feature. For some embodiments, the beauty advisor or the user of the client device 122 can directly specify the target facial feature. For some embodiments, the beauty advisor or the user of the client device 122 selects a desired cosmetic effect, and a target facial feature is determined based on the selected cosmetic effect.

At block 360, the applicator device 102 displays a target sub-region surrounding the target facial feature within the tracked facial region in a second window. For some embodiments, the target sub-region surrounding the target facial feature within the tracked facial region is displayed in the second window displayed on the applicator device 102, and a boundary around the target sub-region surrounding the target facial feature is displayed.

For some embodiments, the target sub-region around the target facial feature is enlarged in the second window. This aids the beauty advisor in precisely applying cosmetic effects to the facial region of the user of the client device 122 while also allowing the user to view the fine details of the application process. For some embodiments, the location of the target facial feature is fixed within the second window based on predefined control points. This feature also facilitates the virtual application process since the target facial feature remains fixed even when the user moves, thereby allowing the beauty advisor to precisely apply the selected cosmetic effect.

To fix the location of the target facial feature within the second window, the applicator device 102 determines a perspective transformation matrix according to the predefined control points and applies the perspective transformation matrix to the target facial feature. For some embodiments, the second window also includes a refinement toolbar for adjusting virtual application of the selected cosmetic effect in the first window and the second window. For example, the refinement toolbar may include a tool that allows the beauty advisor to zoom in or out of the second window to facilitate the virtual application process.

For some embodiments, a visible boundary is displayed around the target sub-region surrounding the target facial feature in both the first window and the second window to highlight to the user of the client device 122 the area of the facial region that will undergo virtual application of the selected cosmetic effect by the beauty advisor. For some embodiments, the beauty advisor utilizing the applicator device 102 controls whether the first window and/or the second window are displayed.

At block 370, the applicator device 102 performs virtual application of a selected cosmetic effect. For some embodiments, virtual application of the selected cosmetic effect is displayed in a first window displayed in a user interface on the client device 122, wherein the first window displays a same content as the first window shown on the applicator device 102. At block 380, the applicator device 102 displays the virtual application of the selected cosmetic effect in the first window and the second window on the applicator device. Thereafter, the process in FIG. 3 ends.

Figure 4:
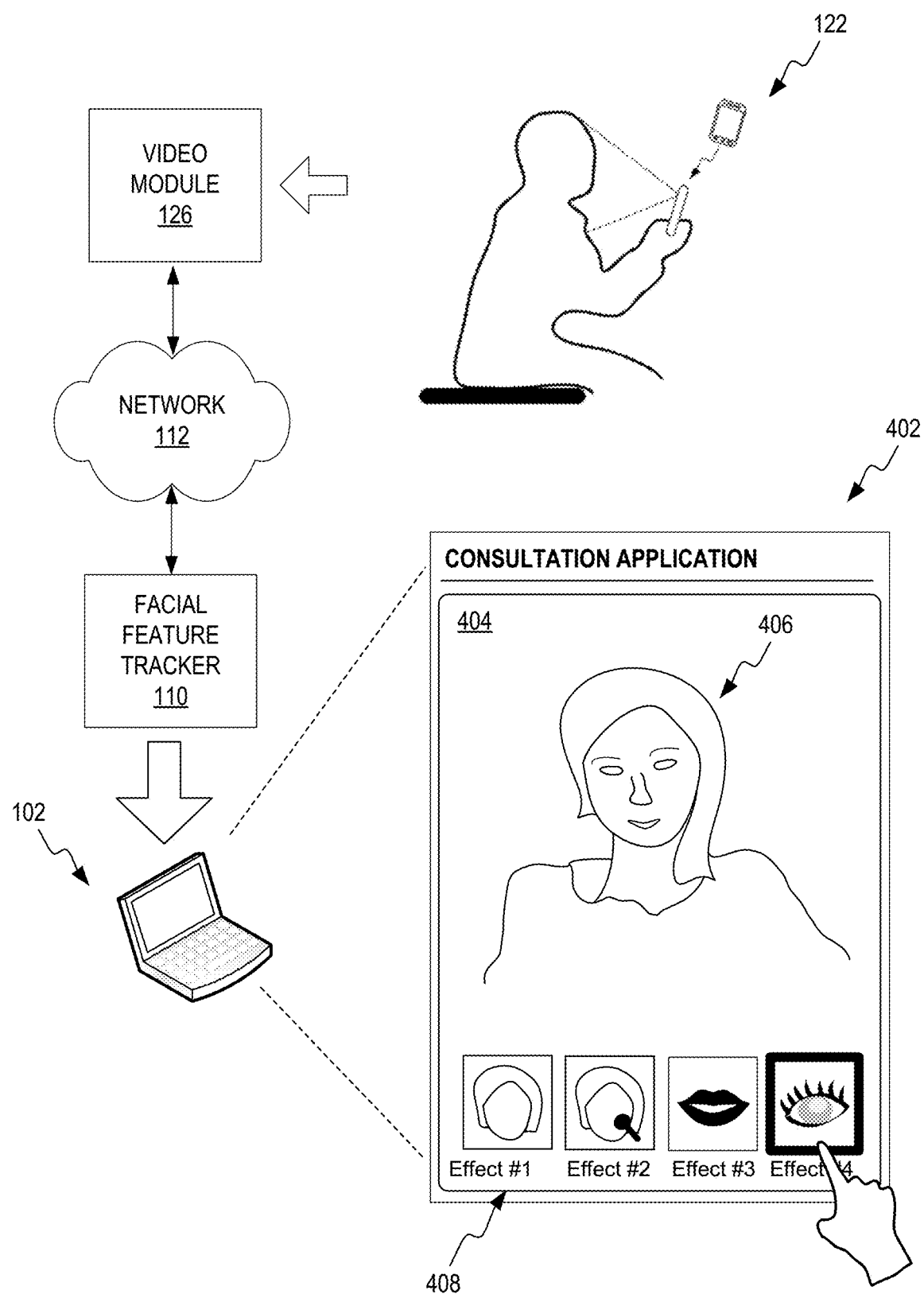
FIG. 4 illustrates an example user interface displayed on the applicator device while the client device is sending a live video stream to the applicator device according to various embodiments of the present disclosure.

To further illustrate various aspects of the present invention, reference is made to the following figures. FIG. 4 illustrates an example user interface 402 displayed on the applicator device 102 while the client device 122 is sending a live video stream to the applicator device 102. The video module 126 executing in the client device 122 directs a camera to capture a live video of the user and live streams the video over the network 114 to the applicator device 102. The facial feature tracker 110 executing in the applicator device 102 begins tracking the facial region 406 of the user of the client device 122 and displays the tracked facial region in a first window 404 in the user interface 402 shown on the applicator device 102.

A cosmetic effects toolbar 408 is shown in the first window of the user interface 402 shown on the applicator device 102, where the beauty advisor can then select one or more cosmetic effects from the cosmetic effects toolbar 408. The command issued by the command generator 108 also causes the client device 122 to display a cosmetic effects toolbar in the first window, where the cosmetic effects toolbar allows the user to select which cosmetic effects that the user wishes to have the beauty advisor apply.

The same user interface 402 displayed on the applicator device 102 side is displayed to the user on the client device 122 side. The example user interface 402 shown in FIG. 4 includes a first window 404, which displays the facial region 406 of the user. The user interface 402 also includes a cosmetic effects toolbar 408 located in the first window 404. In the example shown, the user interface 402 displayed on the applicator device 102 side allows the beauty advisor to view progression of the virtual application being demonstrated to the user of the client device 122.

Figure 5:
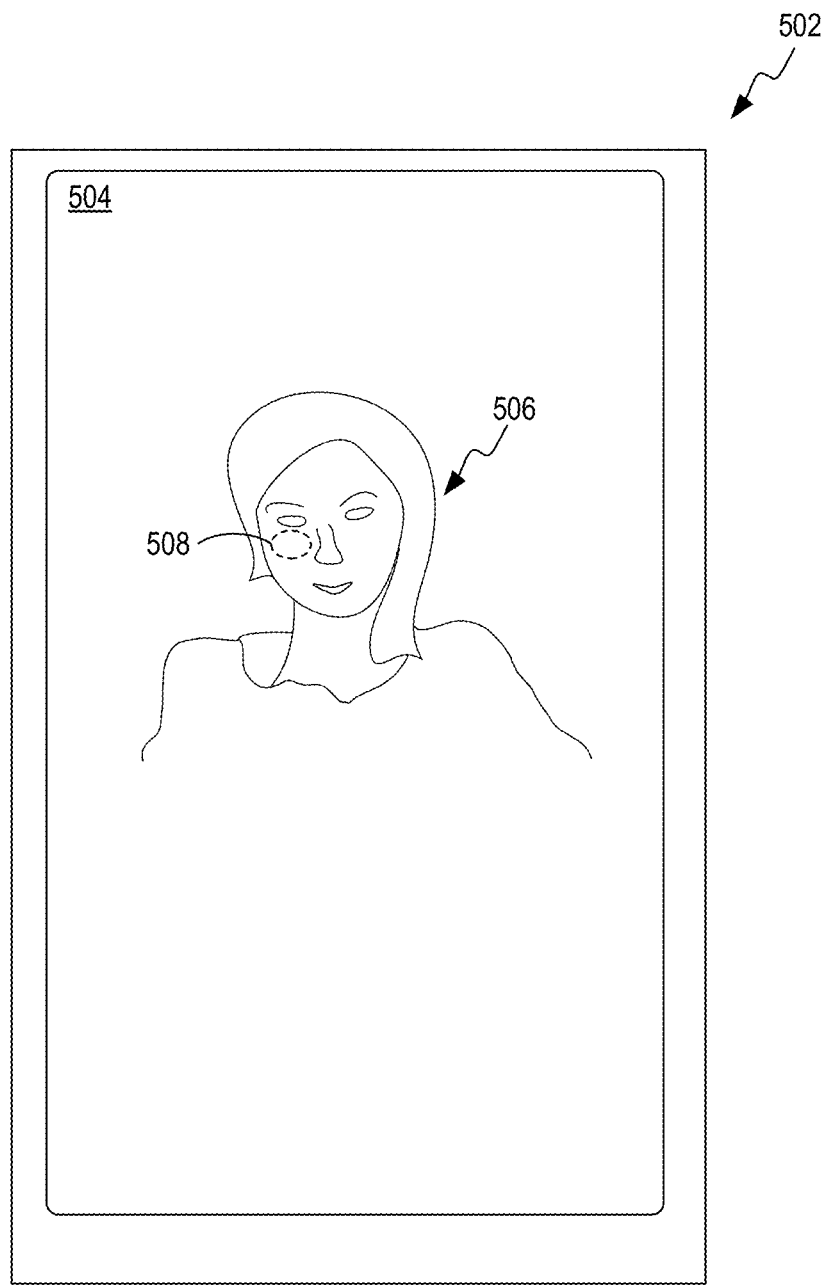
FIG. 5 illustrates an example user interface displayed on the client device in FIG. 1 according to various embodiments of the present disclosure.

FIG. 5 illustrates an example user interface 502 displayed on the client device 122 in FIG. 1. Once the beauty advisor or the user of the client device 122 selects a cosmetic effect, the beauty advisor utilizes the applicator device 102 to demonstrate application of the selected cosmetic effect onto the facial region 506 of the user. The user interface 502 displayed on the client device 122 includes a first window 504 that displays the facial region 506 of the user. As described above, once the beauty advisor or the user of the client device 122 selects a desired cosmetic effect, the applicator device 102 or the client device 122 automatically determines a target facial feature based on the selected cosmetic effect. The first window 504 shows a visible boundary around the target facial feature 508 (i.e., the cheek region). The first window 504 allows the user to zoom in further on the target facial feature.

Figure 6:
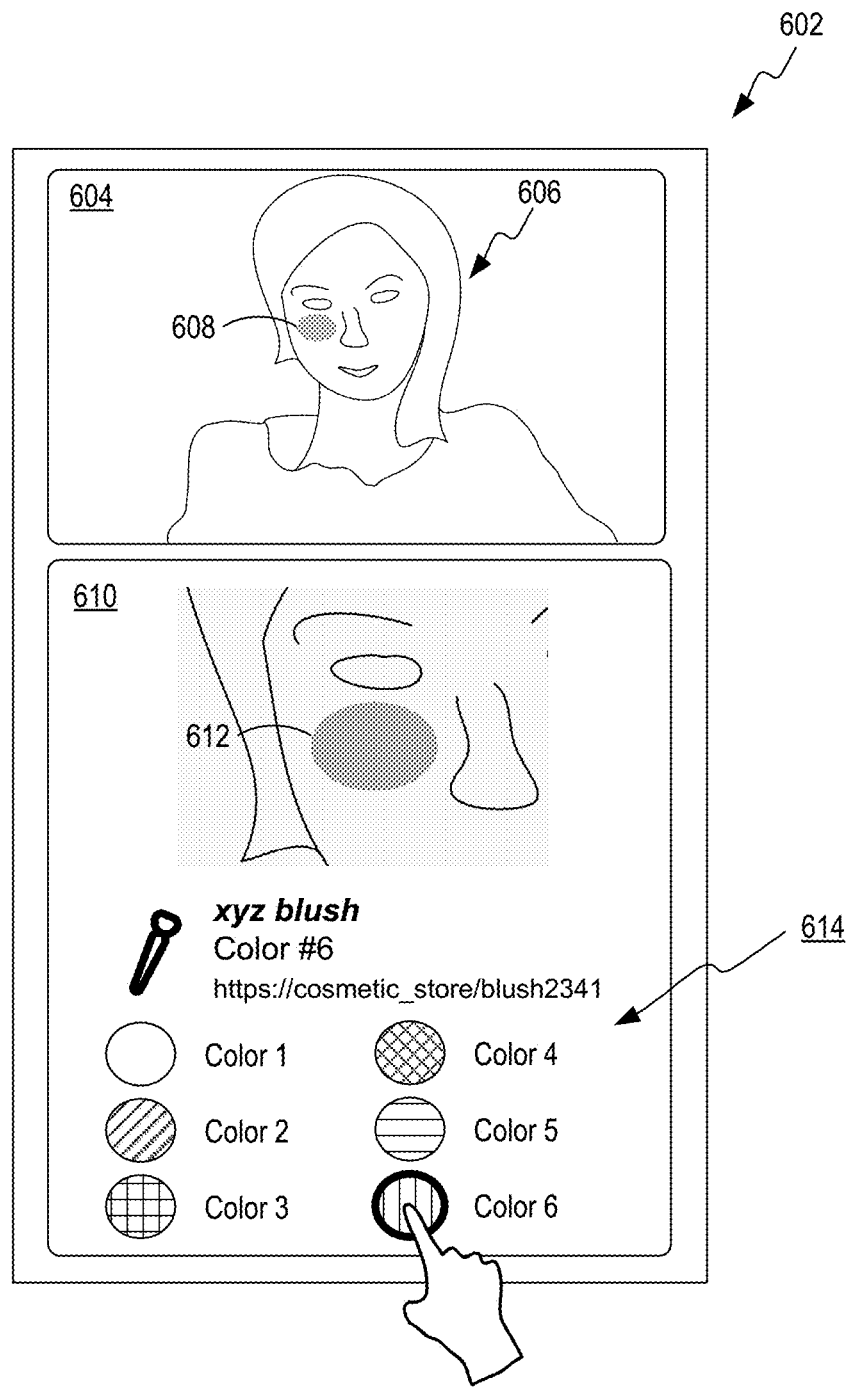
FIG. 6 illustrates application of the selected cosmetic effect in the first window and the second window of the user interface shown on the applicator device in FIG. 1 according to various embodiments of the present disclosure.

FIG. 6 illustrates application of the selected cosmetic effect in a first window 604 and a second window 610 of a user interface 602 shown on the applicator device 102. As the beauty advisor demonstrates application of the selected cosmetic effect using the applicator device 102, the process is displayed to the user of the client device 122. In the example shown, application of the selected cosmetic effect (e.g., blush) is shown in both the first window 604 and the second window 610. Once the beauty advisor or the user of the client device 122 selects a desired cosmetic effect, the applicator device 102 or the client device 122 automatically determines a target facial feature based on the selected cosmetic effect. The user of the client device 122 is also able to review how the beauty advisor utilizes tools from the refinement toolbar 614 to refine application of the selected cosmetic effect. Again, a similar user interface that includes a first window and a second window is shown on the applicator device 102 to facilitate application of the selected cosmetic effect by the beauty advisor. For some embodiments, the beauty advisor utilizing the applicator device 102 controls whether the first window and/or the second window are displayed.

The second window 610 in the user interface 602 provides an enlarged view of the target facial feature 612 with a visible boundary around the target facial feature 612, thereby aiding the beauty advisor during application of the selected cosmetic effect. The second window 610 also includes a refinement toolbar 614 that allows the beauty advisor to further refine application of the selected cosmetic effect. The refinement toolbar 614 may include various tools, including a tool, for example, that allows the beauty advisor to zoom in further on the target facial feature 612. In this regard, the first window and the second window shown on the applicator device 102 facilitates application of the selected cosmetic effect by the beauty advisor.

Figure 7:
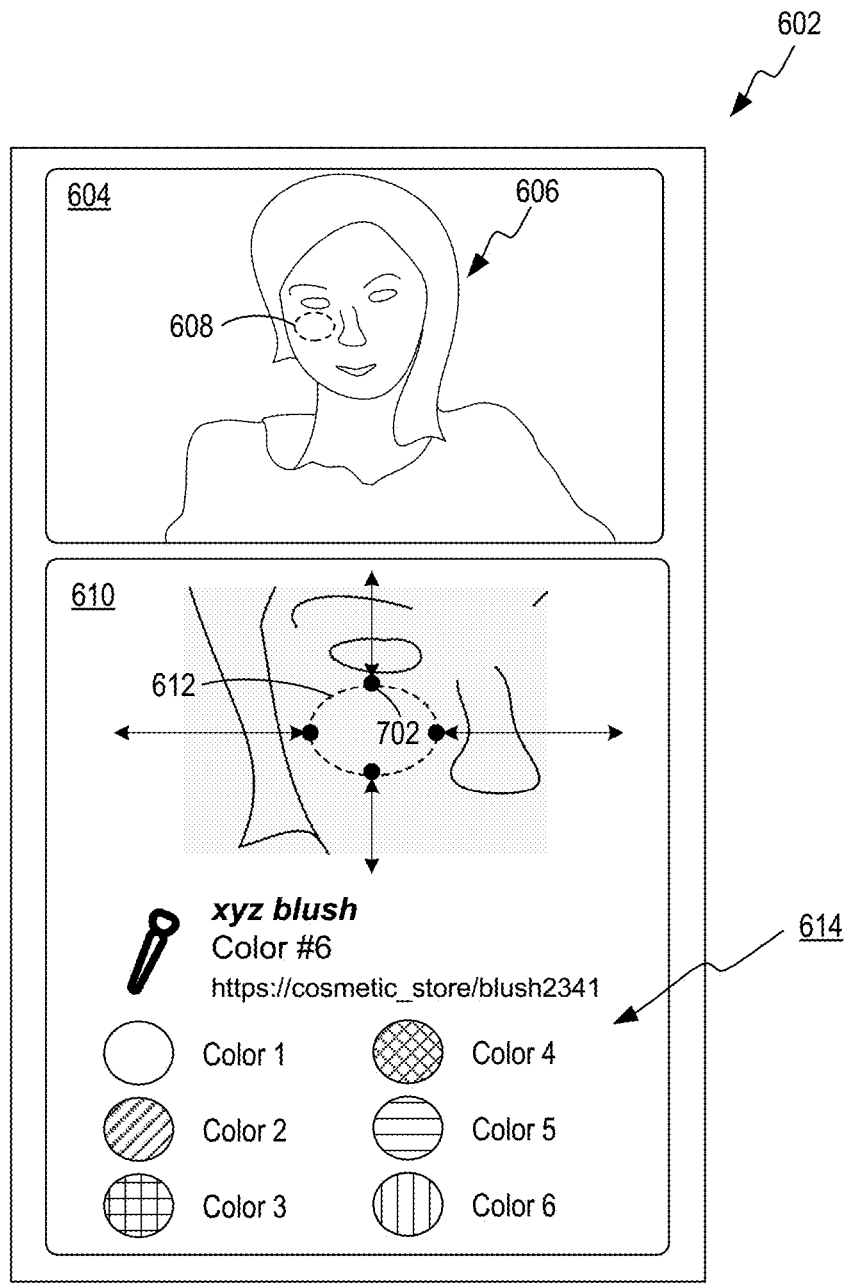
FIG. 7 illustrates how the target facial feature is fixed in the second window of the user interface utilizing predefined control points according to various embodiments of the present disclosure.

FIG. 7 illustrates how the target facial feature is fixed in the second window of the user interface utilizing predefined control points. To facilitate application of the selected cosmetic effect, the location of the target facial feature 612 may be fixed within the second window based on predefined control points 702. This feature facilitates the virtual application process since the target facial feature remains fixed even when the user moves, thereby allowing the beauty advisor to precisely apply the selected cosmetic effect. To fix the location of the target facial feature within the second window, the applicator device 102 determines a perspective transformation matrix according to the predefined control points 702 and applies the perspective transformation matrix to the target facial feature 612.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method implemented in an applicator device, comprising:
receiving a request from a client device to initiate a communication session;

causing a camera of the client device to capture a video of a user of the client device;
obtaining the video of the user;
tracking a facial region of the user depicted in the video and displaying the tracked facial region in a first window;
determining a target facial feature in the tracked facial region;
displaying a target sub-region surrounding the target facial feature within the tracked facial region in a second window, wherein the target sub-region around the target facial feature is enlarged in the second window while the tracked facial region is displayed in the first window, wherein displaying the target sub-region comprises fixing the target facial feature within the second window based on predefined control points;
performing virtual application of a selected cosmetic effect; and
displaying the virtual application of the selected cosmetic effect in the first window and the second window on the applicator device.

2. The method of claim 1, wherein the virtual application of the selected cosmetic effect is displayed in a corresponding first window displayed in a user interface on the client device, wherein the corresponding first window displays a same content as the first window shown on the applicator device.

3. The method of claim 1, wherein one or both the first window and the second window are displayed based on input by a beauty advisor utilizing the applicator device.

4. The method of claim 1, wherein determining the target facial feature in the tracked facial region comprises:
displaying the tracked facial region and a cosmetic effects toolbar in the first window;
obtaining a selection of a cosmetic effect from the cosmetic effects toolbar from one of: a beauty advisor utilizing the applicator device or the user of the client device; and
determining the target facial feature based on the selected cosmetic effect.

5. The method of claim 1, wherein determining the target facial feature in the tracked facial region comprises:
displaying the tracked facial region in the first window;
obtaining a selection of a facial feature from one of: a beauty advisor utilizing the applicator device or the user of the client device; and
determining the target facial feature based on the selected facial feature.

6. The method of claim 1, wherein fixing the location of the target facial feature within the second window based on the predefined control points comprises:
determining a perspective transformation matrix according to the predefined control points; and
applying the perspective transformation matrix to the target facial feature.

7. The method of claim 1, further comprising causing the client device to display a boundary around the tracked facial region in the first window.

8. The method of claim 1, further comprising causing the client device to display a boundary around the target sub-region surrounding the target facial feature.

9. A system comprising:
a memory storing instructions;
a processor coupled to the memory and configured by the instructions to at least:
receive a request from a client device to initiate a communication session;
cause a camera of the client device to capture a video of a user of the client device;
obtain the video of the user;
track a facial region of the user depicted in the video and display the tracked facial region in a first window;
determine a target facial feature in the tracked facial region;
display a target sub-region surrounding the target facial feature within the tracked facial region in a second window, wherein the target sub-region around the target facial feature is enlarged in the second window while the tracked facial region is displayed in the first window, wherein displaying the target sub-region comprises fixing the target facial feature within the second window based on predefined control points;
perform virtual application of a selected cosmetic effect; and
display the virtual application of the selected cosmetic effect in the first window and the second window.

10. The system of claim 9, wherein the virtual application of the selected cosmetic effect is displayed in a corresponding first window displayed in a user interface on the client device, wherein the corresponding first window displays a same content as the first window shown on the system.

11. The system of claim 9, wherein one or both the first window and the second window are displayed based on input by a beauty advisor utilizing the system.

12. The system of claim 9, wherein the processor is configured to determine the target facial feature in the tracked facial region by:
displaying the tracked facial region and a cosmetic effects toolbar in the first window;
obtaining a selection of a cosmetic effect from the cosmetic effects toolbar from one of: a beauty advisor utilizing the system or the user of the client device; and
determining the target facial feature based on the selected cosmetic effect.

13. A non-transitory computer-readable storage medium storing instructions to be implemented by an applicator device having a processor, wherein the instructions, when executed by the processor, cause the applicator device to at least:
receive a request from a client device to initiate a communication session;
cause a camera of the client device to capture a video of a user of the client device;
obtain the video of the user;
track a facial region of the user depicted in the video and display the tracked facial region in a first window;
determine a target facial feature in the tracked facial region;
display a target sub-region surrounding the target facial feature within the tracked facial region in a second window, wherein the target sub-region around the target facial feature is enlarged in the second window while the tracked facial region is displayed in the first window, wherein displaying the target sub-region comprises fixing the target facial feature within the second window based on predefined control points;
perform virtual application of a selected cosmetic effect; and
display the virtual application of the selected cosmetic effect in the first window and the second window.

14. The non-transitory computer-readable storage medium of claim 13, wherein the virtual application of the selected cosmetic effect is displayed in a corresponding first window displayed in a user interface on the client device, wherein the corresponding first window displays a same content as the first window shown on the applicator device.

15. The non-transitory computer-readable storage medium of claim 13, wherein one or both the first window and the second window are displayed based on input by a beauty advisor utilizing the applicator device.

* * * * *